US010895486B2

(12) United States Patent
McCue et al.

(10) Patent No.: US 10,895,486 B2
(45) Date of Patent: Jan. 19, 2021

(54) THERMAL ADJUSTED HYDRAULIC FLUID GAGE

(71) Applicant: Deere & Company, Moline, IL (US)

(72) Inventors: Mark J. McCue, Dubuque, IA (US); Kristen D. Cadman, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 219 days.

(21) Appl. No.: 16/016,868

(22) Filed: Jun. 25, 2018

(65) Prior Publication Data
US 2019/0390995 A1    Dec. 26, 2019

(51) Int. Cl.
*G01F 23/02* (2006.01)
*G01K 5/08* (2006.01)
*G01K 5/20* (2006.01)
*E02F 9/22* (2006.01)

(52) U.S. Cl.
CPC ............. *G01F 23/02* (2013.01); *G01K 5/08* (2013.01); *G01K 5/20* (2013.01); *E02F 9/22* (2013.01)

(58) Field of Classification Search
CPC ........ G01F 23/02; G01F 23/246; G01F 23/00; G01F 23/56; G01F 23/30; G01K 5/08; G01K 5/20; E02F 9/22; G21C 17/035; H01H 29/18; H01H 29/26; H01H 29/28; H01H 29/30; B21D 5/04; B21D 7/06
See application file for complete search history.

(56) References Cited

U.S. PATENT DOCUMENTS

| | | | | |
|---|---|---|---|---|
| 5,323,653 A * | 6/1994 | Gruett | ................... | G01K 13/02 374/E13.006 |
| 5,808,187 A * | 9/1998 | Gooden | ................ | F01M 11/04 73/114.54 |
| 6,301,947 B1 * | 10/2001 | McCombs, Jr. | ........ | G01F 23/04 72/295 |
| 6,758,092 B2 * | 7/2004 | Wech | ...................... | G01F 23/02 73/325 |
| 2017/0245434 A1 * | 8/2017 | Jung | .................... | A01D 41/127 |

FOREIGN PATENT DOCUMENTS

CN         202382770 U     8/2012

OTHER PUBLICATIONS

"Oil Level Gauge with Temperature Indicator"; Buyers Products. com, retrieved Sep. 8, 2017.

* cited by examiner

*Primary Examiner* — Harshad R Patel
*Assistant Examiner* — Nigel H Plumb

(57) ABSTRACT

A hydraulic fluid gage for measuring hydraulic fluid in a hydraulic tank of a work vehicle. The hydraulic fluid gage may include a body, a fluid connection (s), thermometer, and a range indicator. The body is used to receive the hydraulic fluid from the hydraulic tank. The fluid connection is coupled between the body and the hydraulic tank to communicate hydraulic fluid. The range indicator includes a plurality of ranges of temperature, each of which aligns vertically relative to one another. The thermometer is positioned relative to the range indicator such that the temperature indicated by the thermometer corresponds to one of the ranges of temperature, each of the ranges of temperature corresponding to a recommended range of the hydraulic fluid volume in the hydraulic tank. As such, the gage allows a user to measure the hydraulic fluid volume in the hydraulic tank without the influence from different temperature.

20 Claims, 6 Drawing Sheets

THERMAL ADJUSTED HYDRAULIC FLUID GAGE

RELATED APPLICATIONS

N/A.

FIELD OF THE DISCLOSURE

The present disclosure relates generally to a hydraulic fluid gage applied on a hydraulic fluid tank.

BACKGROUND OF THE DISCLOSURE

Hydraulic fluid is widely utilized in various kinds of work machines, such as excavators, dump trucks, tractors, and harvesters. Work tools of the work machines can be moved via hydraulic actuators, where the power is transferred by the hydraulic fluid. It is necessary for a user to ensure the volume of the hydraulic fluid is maintained at an appropriate/recommended range. If the hydraulic fluid is beyond that range, the hydraulic fluid may spill out of the reservoir/tank or cost the user extra money for the unnecessary amount of hydraulic fluid. If the hydraulic fluid is not enough, some work tools may not be properly driven by the hydraulic fluid. However, the appropriate range is subject to change due to thermal expansion of the hydraulic fluid.

SUMMARY OF THE DISCLOSURE

According to an aspect of the present disclosure, a hydraulic fluid gage for measuring hydraulic fluid in a hydraulic tank of a work vehicle may include a body, at least one fluid connection, a thermometer, and a range indicator. The body is used to receive the hydraulic fluid from the hydraulic tank. The fluid connection is coupled between the body and the hydraulic tank to communicate hydraulic fluid therebetween such that a level of the hydraulic fluid in the body indicates a volume of the hydraulic fluid in the hydraulic tank. The thermometer is used to indicate a temperature of the hydraulic fluid. The range indicator includes a plurality of ranges of temperature, each of which aligns vertically relative to one another. The thermometer is positioned relative to the range indicator such that the temperature indicated by the thermometer corresponds to one of the ranges of temperature, each of the ranges of temperature corresponding to a recommended range of the hydraulic fluid volume in the hydraulic tank.

According to an aspect of the present disclosure, a work vehicle includes a hydraulic tank, and a hydraulic fluid gage for measuring hydraulic fluid in the hydraulic tank of the work vehicle. The hydraulic fluid gage may include a body, at least one fluid connection, a thermometer, and a range indicator. The body is used to receive the hydraulic fluid from the hydraulic tank. The fluid connection is coupled between the body and the hydraulic tank to communicate hydraulic fluid therebetween such that a level of the hydraulic fluid in the body indicates a volume of the hydraulic fluid in the hydraulic tank. The thermometer is used to indicate a temperature of the hydraulic fluid. The range indicator includes a plurality of ranges of temperature, each of which aligns vertically relative to one another. The thermometer is positioned relative to the range indicator such that the temperature indicated by the thermometer corresponds to one of the ranges of temperature, each of the ranges of temperature corresponding to a recommended range of the hydraulic fluid volume in the hydraulic tank.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Work vehicles, including but not limited to dump trucks, loaders, dozers, excavators, and motor graders, may utilize a hydraulic system to control a work tool. The hydraulic system includes generator(s)/pump(s), hydraulic tank(s), valve(s), and hydraulic actuator(s). In general practice, a user of a work vehicle may need to check the volume of hydraulic fluid in the hydraulic tank to ensure it is within a recommended range.

Determining the volume of hydraulic fluid in the hydraulic tank may rely on a hydraulic fluid gage showing the level of the hydraulic fluid. This measurement, ideally, may be only applicable on specific temperature (baseline temperature), for example, 25° C. (77° F.). However, if the hydraulic fluid gage is operated at the temperature other than the specific temperature, the level of the hydraulic fluid will mislead the user because the volume of hydraulic fluid increases or decreases due to thermal expansion. The expansion rate depends on the type of hydraulic fluid. For example, one of the common hydraulic fluids thermally expands by roughly 0.09% per degree Celsius (0.05% per degree Fahrenheit). Such thermal expansion rate multiplies coupled with a relatively large amount of hydraulic fluid in the hydraulic tank may cause the user to overestimate or underestimate the hydraulic tank volume by seeing the level of the hydraulic fluid in the gage.

There are at least two factors that influence the temperature of the hydraulic fluid in the hydraulic tank. First, the ambient temperature may not be at the baseline temperature (e.g. 25° C.). Second, the hydraulic fluid temperature increases because of the hydraulic operation even if the ambient temperature is equal to the baseline temperature. The present disclosure broadens the applicability of the hydraulic fluid gage such that the user can determine whether the volume of the hydraulic fluid in the hydraulic tank is at the recommended range.

Figure 1:
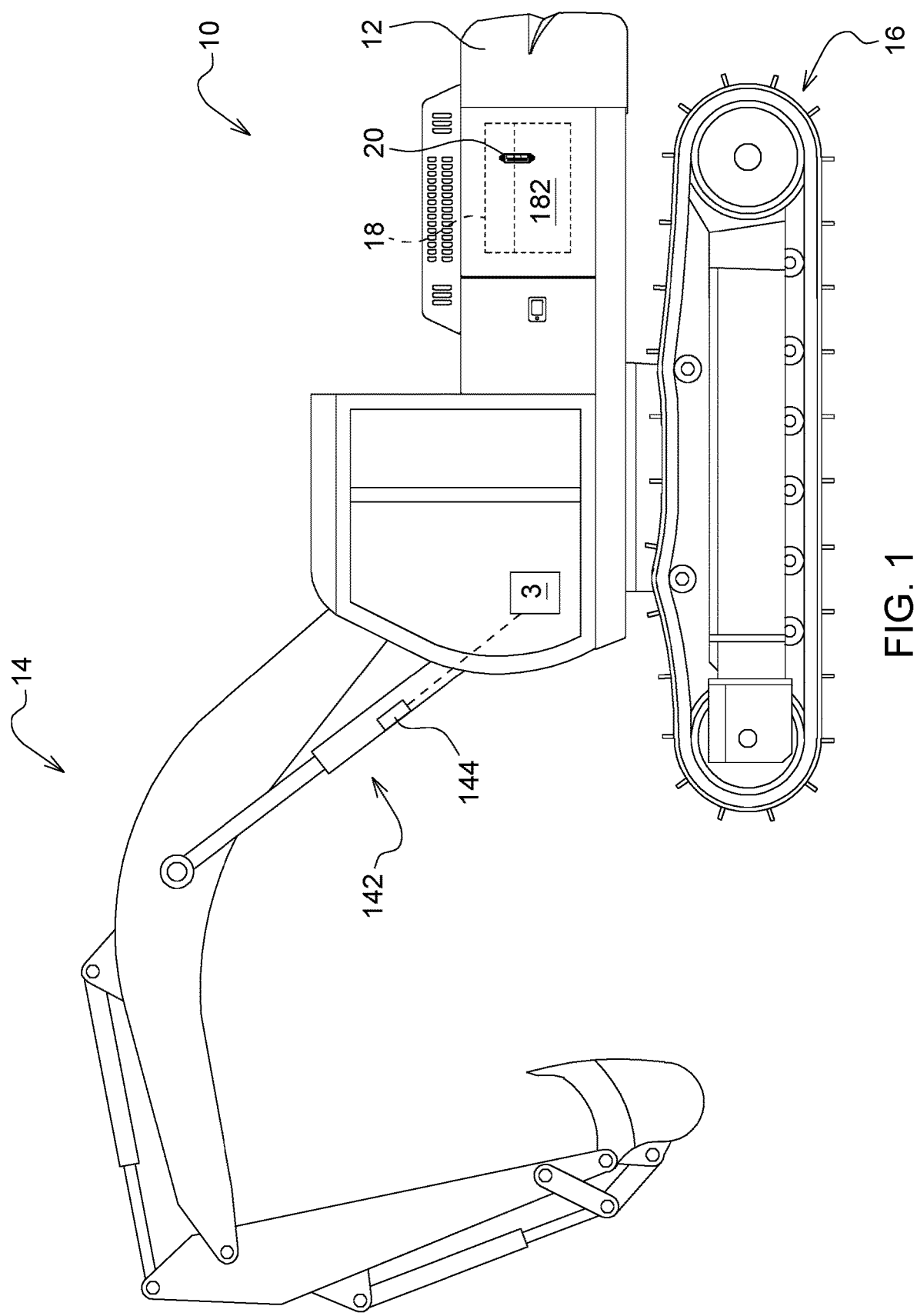
FIG. 1 illustrates a side view of a work vehicle with a hydraulic fluid gage.
Figure 2:
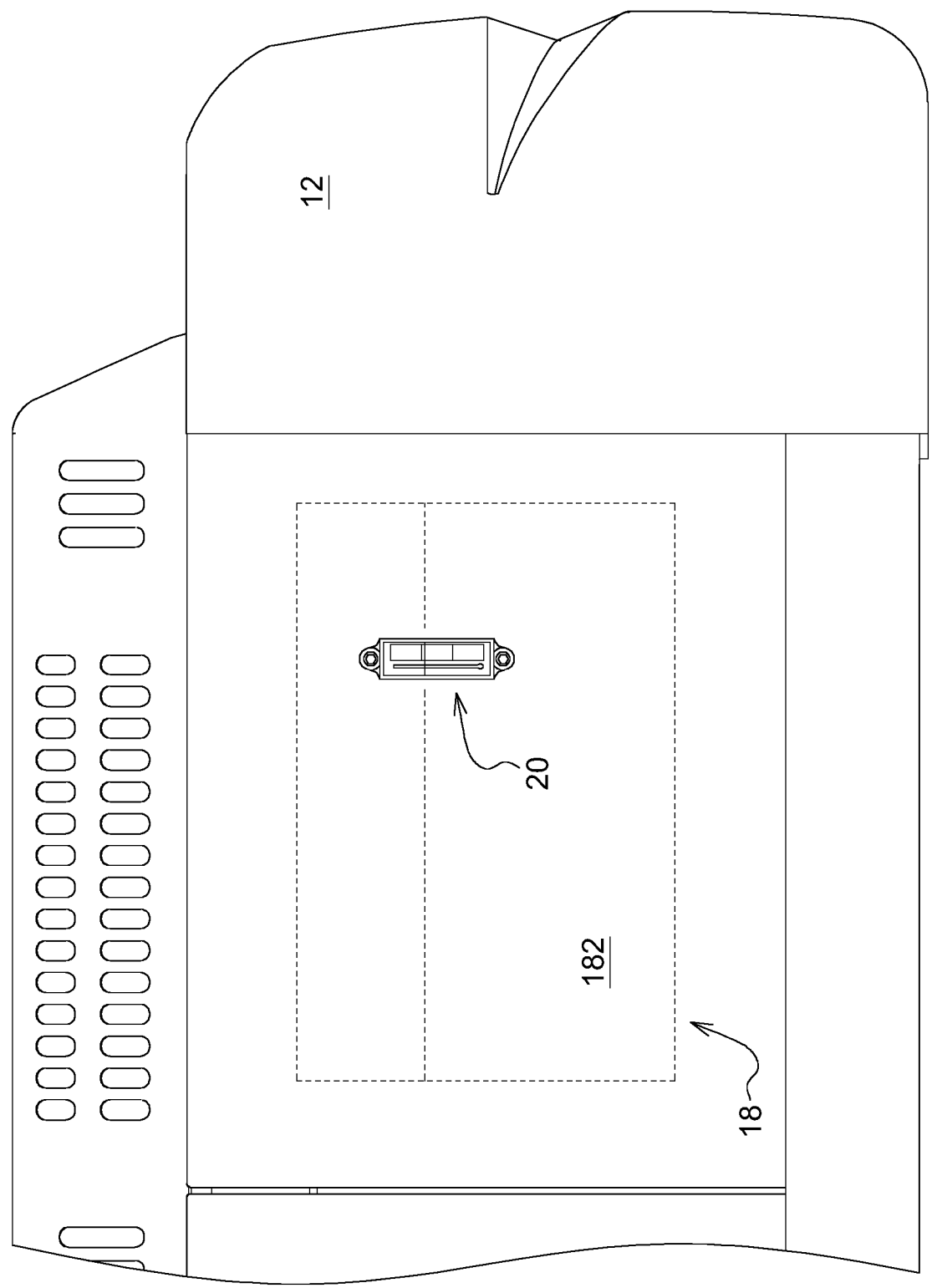
FIG. 2 is a partial enlarged view of FIG. 1.

Referring to FIGS. 1 and 2, a work vehicle 10 in this embodiment is an excavator. Other work vehicles 10 are contemplated by this disclosure. The work vehicle 10 includes a frame 12, a work tool 14, a hydraulic tank 18, a hydraulic fluid gage 20, and a controller 3. The work tool 14 in this embodiment is coupled to the frame 12 and driven by at least one actuator 142 to perform its operation. The actuator 142 is actuated by the pressure from the hydraulic fluid 182. The majority of the hydraulic fluid 182, when it is not in operation, may be received by the hydraulic tank 18. The hydraulic tank 18 in this embodiment is covered by the frame 12 and therefore is illustrated by a dashed line. The hydraulic fluid gage 20 is coupled to the frame 12 and is configured to indicate the volume of hydraulic fluid. It is noted that FIGS. 1 and 2 merely illustrate the hydraulic fluid gage 20 utilized on the excavator, but it can also be utilized on other types of work vehicles 10, included but not limited to dump trucks, loaders, dozers, and motor graders. In addition, the hydraulic fluid gage 20 can also be utilized in other types of hydraulic systems, including but not limited to a hydraulic braking system.

Figure 3:
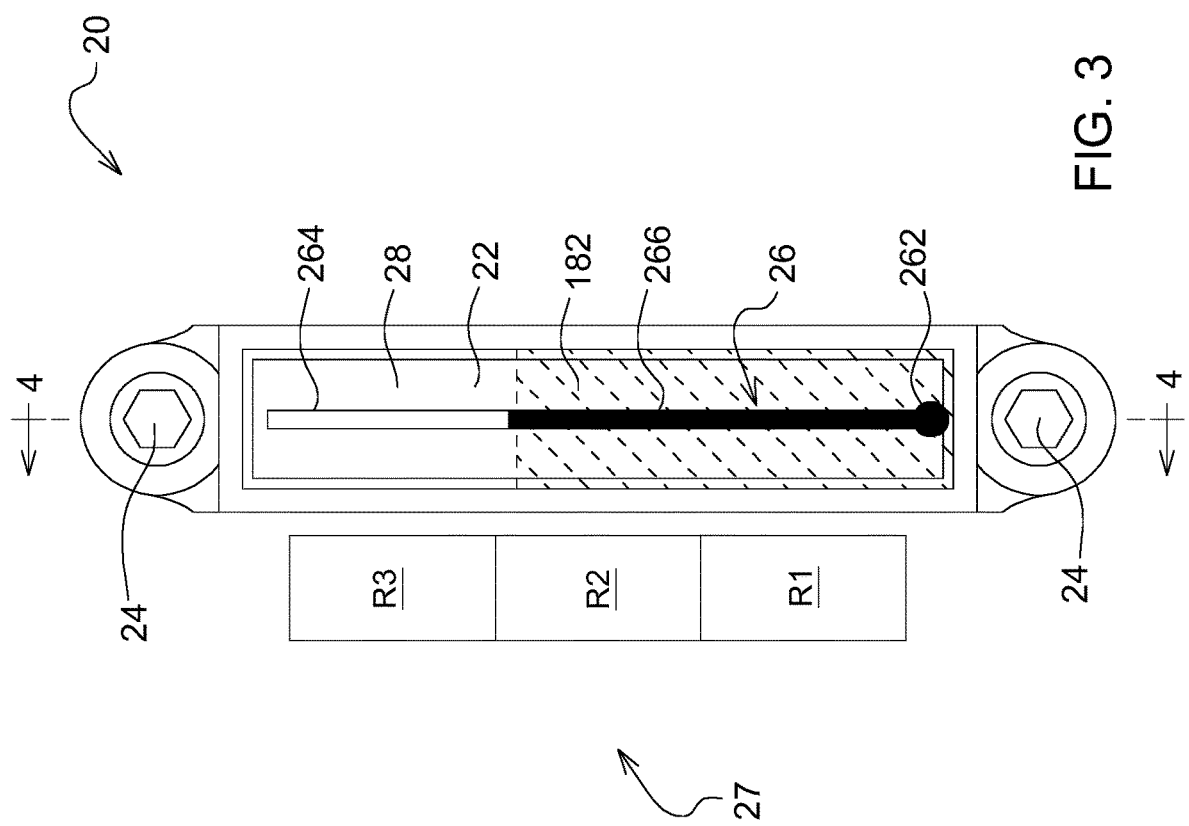
FIG. 3 illustrates an embodiment of a hydraulic fluid gage.
Figure 4:
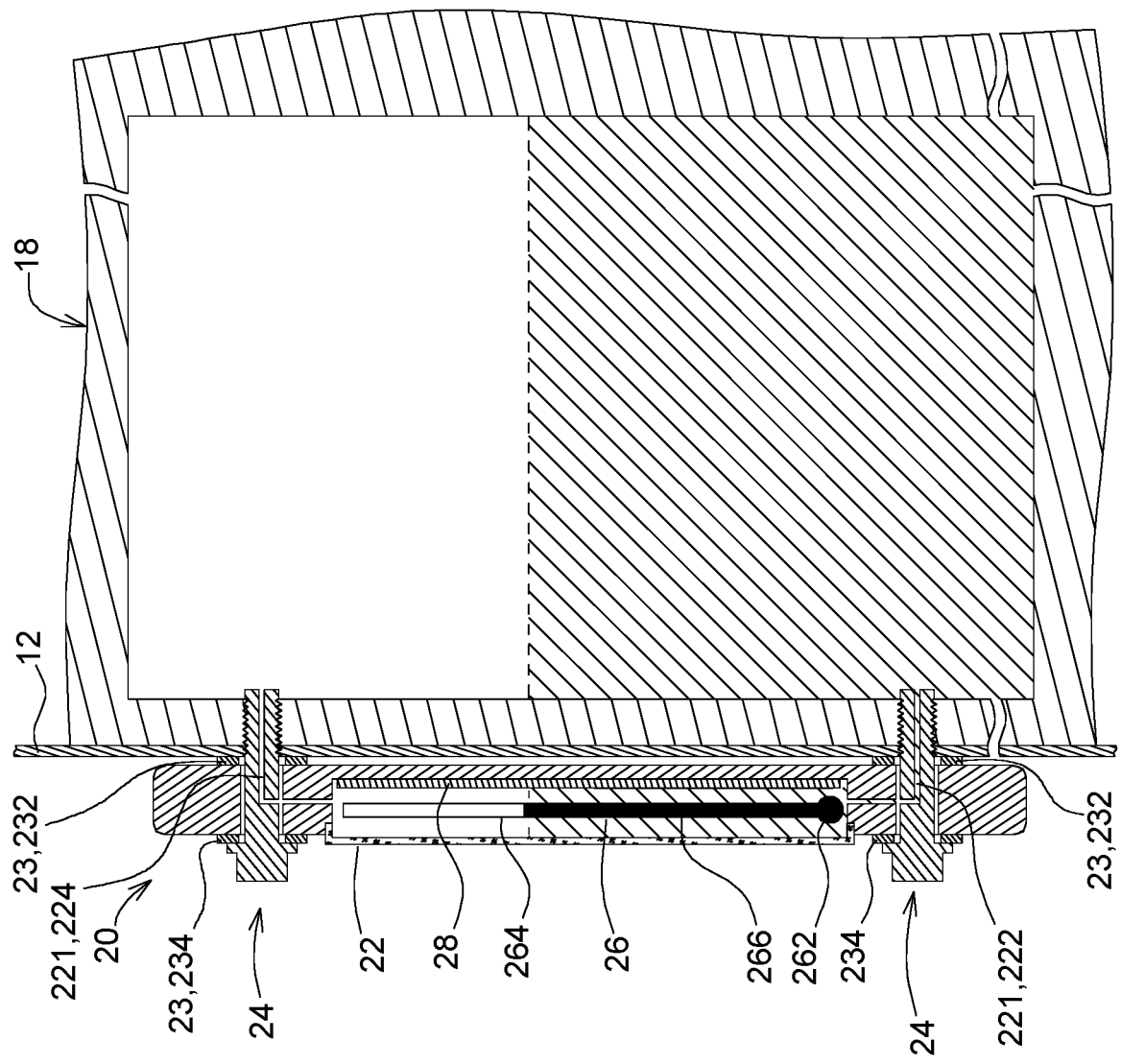
FIG. 4 is a cross-sectional view of the hydraulic fluid gage illustrated in FIG. 3 coupled to the work vehicle.

Referring to FIGS. 3 and 4, the hydraulic fluid gage 20 includes a body 22, a seal assembly 23, two fastening structures 24, a thermometer 26, a range indicator 27, and a thermal conduction plate 28. In this embodiment, the body 22 is fastened on the frame 12 of the work vehicle 10 via the two fastening structures 24. One of the fastening structures 24 is positioned in the proximity to the top of the body 22, and the other is positioned in the proximity to the bottom of the body 22. The body 22 of the hydraulic fluid gage 20 is coupled to an exterior of the work vehicle 10.

The body 22 of the hydraulic fluid gage 20 is configured to receive the hydraulic fluid 182 from the hydraulic tank 18. To achieve this result, there is at least one fluid connection coupled between the body 22 and the hydraulic tank 18 that a level of the hydraulic fluid 182 in the body 22 indicates a volume of the hydraulic fluid 182 in the hydraulic tank 18. In this embodiment, the at least one fluid connection 221 includes a first fluid connection 222 and a second fluid connection 224. Parts of the first and the second fluid connections 222, 224 are formed within the two fastening structures 24, which are internally relieved bolt (e.g. banjo bolts) in this embodiment, and another parts of first and the second fluid connections 222, 224 are formed within the body 22. The seal assembly 23 includes two first seals 232 clamped between the frame 12 and the body 22, and two second seals 234 clamped between the body 22 and the heads of the fastening structure 24. Each of the fastening structures 24, as shown in FIG. 4, is positioned through the hydraulic tank 18, the frame 12, the first seal 232, the body 22, and the second seal 234. The first seals 232 prevent potential hydraulic fluid leakage from the space between the edge of the apertures of the frame 12 and the shafts of the fastening structures 24. The second seals 234 prevent potential hydraulic fluid leakage from the space between the edge of the apertures of the body 22 and the shafts of the fastening structures 24. The bottom of each of the fastening structure 24 has an opening for the hydraulic fluid 182 or air flowing through. Because the level of the hydraulic fluid 182 is above the lower fastening structure 24 but under the higher fastening structure 24, the first fluid connection 222 provides hydraulic fluid communication and the second fluid connection 224 provides air communication to maintain substantially the same air pressure in the hydraulic tank 18 and the body 22 such that the user can read a precise result from the hydraulic fluid gage 20. It is noted that using the internally relieved bolt in this embodiment is only for illustrating purpose; the fastening structures 24 can be other types of fasteners, and the fluid connection(s) can be other types, such as a tube protruding from one of the body 22, the frame 12, and the hydraulic tank 18 for providing hydraulic fluid communication.

The thermometer 26 can be positioned inside or outside of the body 22 of the hydraulic fluid gage 20. In the embodiment as shown in FIGS. 3 and 4, the thermometer 26 is positioned within the body 22, and at least partially immersed in the hydraulic fluid to measure the temperature of the hydraulic fluid 182 directly. The thermometer 26 includes a storage portion 262 and an illustrating portion 264 with a channel coupled to the top of the storage portion 262. The storage portion 262 receives an indicative fluid 266. The indicative fluid 266 can be mercury, alcohol, or other substance subject to thermal expansion, and the range between the boiling and freezing points covers the common temperature of the hydraulic fluid 182. Due to thermal expansion, the indicative fluid 266 expands, and a portion of the indicative fluid 266 flows into the channel of the illustrating portion 264 of the thermometer 26 and moves along the channel based upon the temperature of the hydraulic fluid. It is noted that the sizes of the storage portion 262 and the illustrating portion 264 are used for demonstrating purpose and do not limit the scope of the present disclosure.

The range indicator 27 includes a plurality of ranges of temperature. The ranges of temperature align vertically relative to one another. In this embodiment, the ranges of temperature are range 1 R1 (low temperature range), range 2 R2 (moderate temperature range), and range 3 R3 (high temperature range). For demonstrating purpose, range 1 R1 starts from −10° C. to 23° C., range 2 R2 starts from 23° C. to 57° C., and range 3 R3 starts from 57° C. to 90° C. The thermometer 26 is positioned relative to the range indicator 27 such that the temperature indicated by the thermometer 26 corresponds to one of the ranges of temperature, which is R2 as shown in FIG. 3. Each of the ranges of temperature is corresponding to a recommended range of hydraulic fluid volume. FIG. 3 demonstrates the range indicator 27 is positioned in proximity to the body 22 of the hydraulic fluid gage 20. The detail of the cooperation between the body 22, thermometer 26, and the range indicator 27 will be described later.

The thermal conduction plate 28 is positioned within the body 22 of the hydraulic fluid gage 20. The thermal conduction plate 28 is coupled to the thermometer 26 and is used for unifying the temperature of the hydraulic fluid 182 in the body 22 of the hydraulic fluid gage 20.

Figure 5:
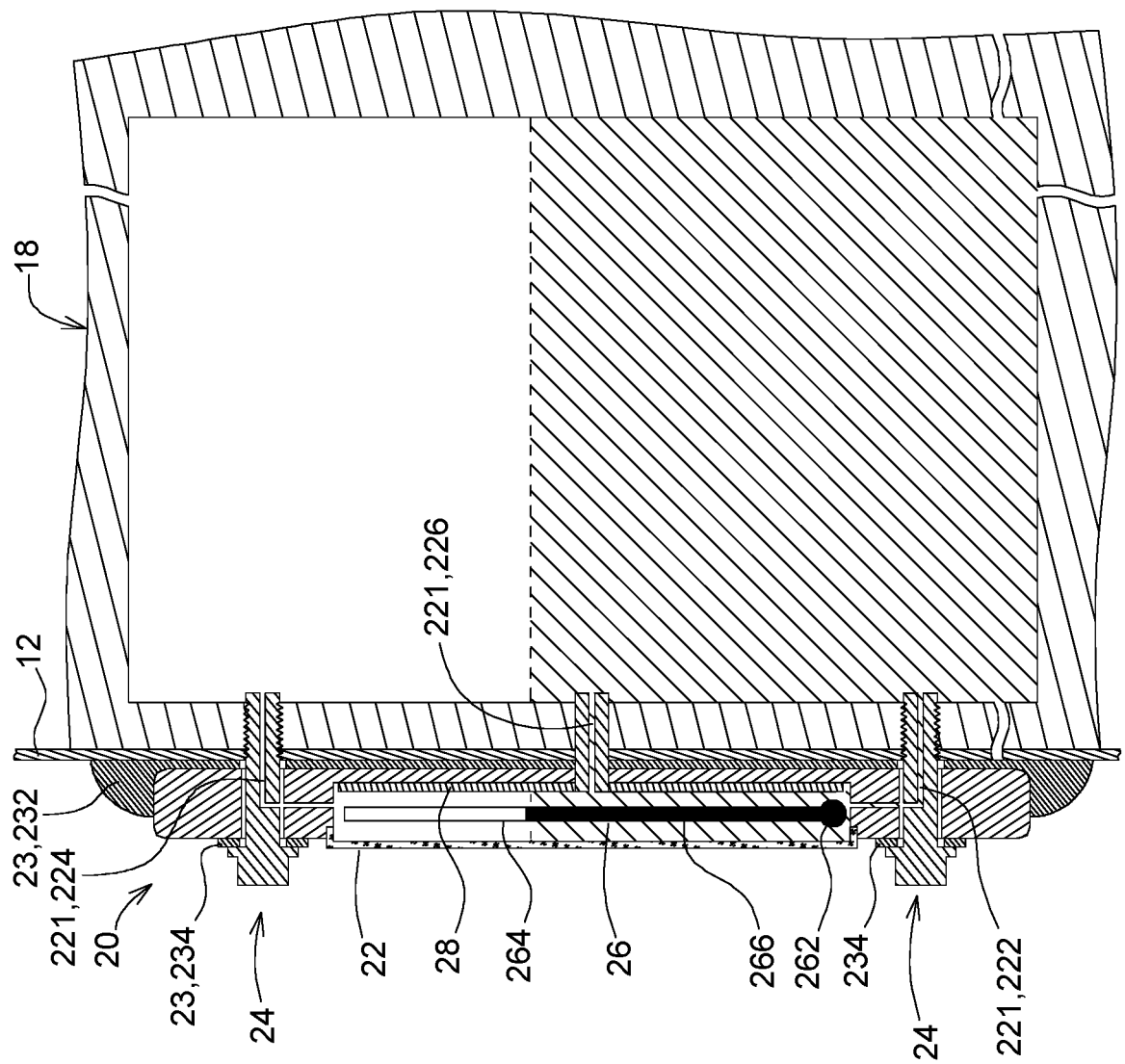
FIG. 5 is a cross-sectional view of an another embodiment of a hydraulic fluid gage coupled to the hydraulic tank with three fluid connections.

Referring to FIG. 5, another embodiment of hydraulic fluid gage 20 is introduced. In this embodiment, the multiple fluid connections include the first and second fluid connections 222, 224, and a third fluid connection 226. The first and second fluid connections 222, 224, similar to those in FIG. 4, are partially formed in the body 22 and the two fastening structures 24. The third fluid connection 226 is formed by a tube protruded from the body 22 into the hydraulic tank 18 to provide fluid communication between the body 22 and the hydraulic tank 18. It is noted that the first seal 232 in this embodiment is a one-piece structure and has an aperture for the tube to pass through. Also, the thermal conduction plate 28, the frame 12, and the hydraulic tank 18 have apertures for the tube to pass through. As shown in FIG. 5, the first and third fluid connections 222, 226 are under the hydraulic fluid 182 in the hydraulic tank 18. Because the hydraulic fluid 182 in different depths may have different temperature in the hydraulic tank 18, the first and third fluid connections 222, 226 may allow the hydraulic fluid 182 with different temperature to flow into the body 22 such that the overall temperature of the hydraulic fluid 182 in the body 22 can be closer to that in the hydraulic tank 18. The thermal conduction plate 28 is configured to distribute heat from the openings of the first and third fluid connections 222, 226. Optionally, the top and the bottom of the first seal 232 protrude two limiting edges which may be used for aligning of the body 22 relative to the one-piece first seal 232 and enhancing the sealing efficiency.

The range indicator 27 can be positioned outside the body 22 (as shown in FIG. 3) or positioned within the body 22 (as shown in FIG. 6A-8B). For the latter, the range indicator 27 can be attached on the thermal conduction plate 28.

FIGS. 6A-8B demonstrate the cooperation between the body 22, thermometer 26, and the range indicator 27.

Figure 6A:
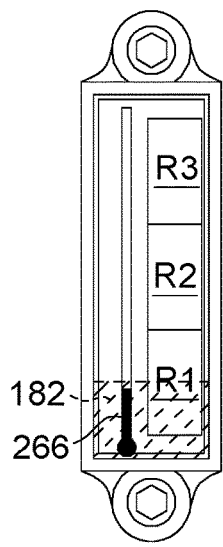
FIG. 6A illustrates an hydraulic fluid gage measuring a low temperature with a hydraulic fluid volume within a range of recommended volume.
Figure 6B:
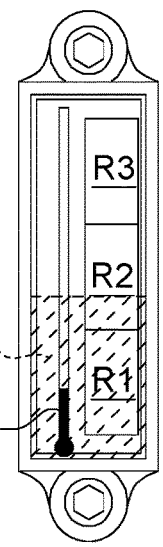
FIG. 6B illustrates the hydraulic fluid gage measuring the low temperature with a hydraulic fluid volume more than the range of the recommended volume.

FIGS. 6A and 6B illustrate a hydraulic fluid gage 20 measuring a low temperature. When the thermometer 26 indicates the temperature of the hydraulic fluid 182 via the level of the indicative fluid 266, which corresponds/designates the range 1 R1 (−10° C. to 23° C.) of the range indicator 27. Concurrently, the range 1 R1 also means that, in the low temperature, the level of the hydraulic fluid 182 in the body 22 should be within the range 1 R1 (the top and bottom of the range 1 R1), which reflects a recommended range of the hydraulic fluid 182 in the hydraulic tank 18. In FIG. 6A, because the level of the indicative fluid 266 and the level of the hydraulic fluid 182 are both within the range 1 R1, the hydraulic fluid 182 in the hydraulic tank 18 is within the recommended range in the low temperature. On the contrary, in FIG. 6B, because the level of the indicative fluid 266 is within the range 1 R1 but the level of the hydraulic fluid 182 is within the range 2 R2, the volume of hydraulic fluid 182 in the hydraulic tank 18 is more than the recommended range.

Figure 7A:
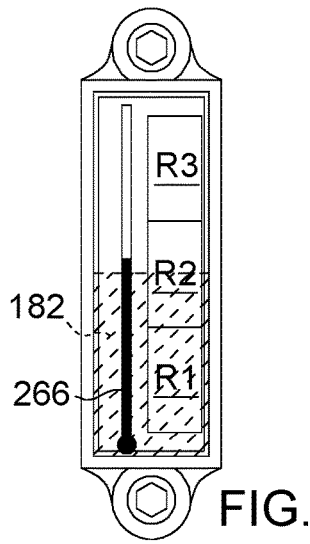
FIG. 7A illustrates the hydraulic fluid gage measuring a moderate temperature with a hydraulic fluid volume within a range of recommended hydraulic fluid volume.
Figure 7B:
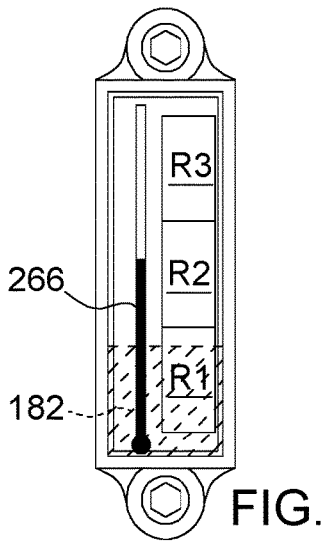
FIG. 7B illustrates the hydraulic fluid gage measuring the moderate temperature with a hydraulic fluid volume less than the range of the recommended volume.
Figure 7C:
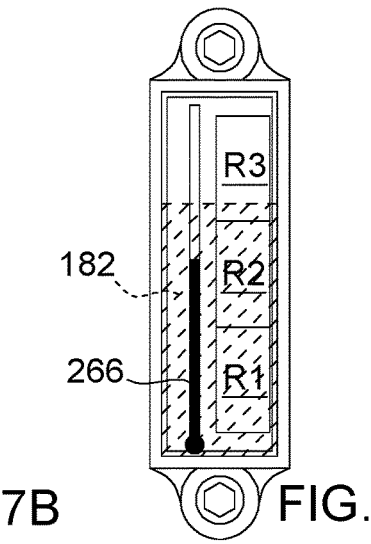
FIG. 7C illustrates the hydraulic fluid gage measuring the moderate temperature with a hydraulic fluid volume more than the range of the recommended volume.

FIGS. 7A-7C illustrate a hydraulic fluid gage 20 measuring a moderate temperature. When the thermometer 26 indicates the temperature of the hydraulic fluid 182 via the level of the indicative fluid 266, which corresponds/designates the range 2 R2 (23° C. to 57° C.) of the range indicator 27. Concurrently, the range 2 R2 also means that, in the moderate temperature, the level of the hydraulic fluid 182 in the body 22 should be within the range 2 R2 (the top and bottom of the range 2 R2), which reflects a recommended range of the hydraulic fluid 182 in the hydraulic tank 18. In FIG. 7A, because the level of the indicative fluid 266 and the level of the hydraulic fluid 182 are both within the range 2 R2, the hydraulic fluid 182 in the hydraulic tank 18 is within the recommended range in the moderate temperature. On the contrary, in FIG. 7B, because the level of the indicative fluid 266 is within the range 2 R2 but the level of the hydraulic fluid 182 is within the range 1 R1, the volume of hydraulic fluid 182 in the hydraulic tank 18 is less than the recommended range. In FIG. 7C, because the level of the indicative fluid 266 is within the range 2 R2 but the level of the hydraulic fluid 182 is within the range 3 R3, the volume of hydraulic fluid 182 in the hydraulic tank 18 is more than the recommended range.

Figure 8A:
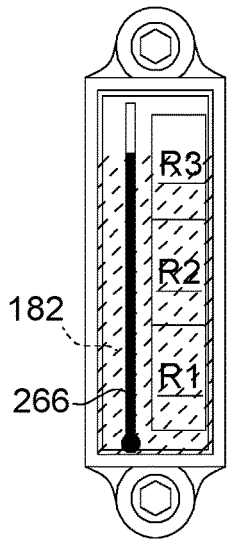
FIG. 8A illustrates the hydraulic fluid gage measuring a high temperature with a hydraulic fluid volume within a range of recommended hydraulic fluid volume.
Figure 8B:
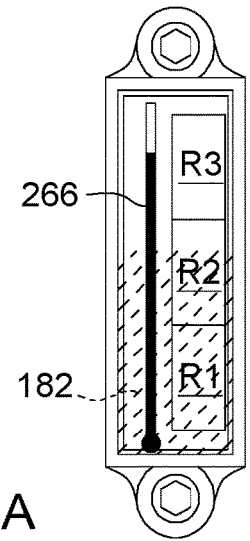
FIG. 8B illustrates the hydraulic fluid gage measuring the high temperature with a hydraulic fluid volume less than a range of recommended hydraulic fluid volume.

FIGS. 8A and 8B illustrate a hydraulic fluid gage 20 measuring a high temperature. When the thermometer 26 indicates the temperature of the hydraulic fluid 182 via the level of the indicative fluid 266, which corresponds/designates the range 3 R3 (57° C. to 90° C.) of the range indicator 27. Concurrently, the range 3 R3 also means that, in the high temperature, the level of the hydraulic fluid 182 in the body 22 should be within the range 3 R3 (the top and bottom of the range 3 R3), which reflects a recommended range of the hydraulic fluid 182 in the hydraulic tank 18. In FIG. 8A, because the level of the indicative fluid 266 and the level of the hydraulic fluid 182 are both within the range 3 R3, the hydraulic fluid 182 in the hydraulic tank 18 is within the recommended range in the high temperature. On the contrary, in FIG. 8B, because the level of the indicative fluid 266 is within the range 3 R3 but the level of the hydraulic fluid 182 is within the range 2 R2, the volume of hydraulic fluid 182 in the hydraulic tank 18 is less than the recommended range.

The number and the scope of the ranges in the range indicator 27 are only for demonstration. Any modification of the number and the scope of the ranges shall not depart from the essence of the present disclosure.

Referring to FIG. 1, optionally, the work vehicle 10 may comprise a sensor 144 for detecting the extension of the actuator 142. The controller 3, the pump (not shown), the actuator 142, and the sensor 144 may form a closed loop control system. The controller 3 may control the actuator 142, via the signal transmitted from the sensor 144, to move in a pre-set extension amount. In this regard, when the user reads the level of the hydraulic fluid 182 in the hydraulic fluid gage 20, the amount of the hydraulic fluid 182 staying in the actuator 142 will be the same (pre-set volume) such that the user can evaluate the amount of the hydraulic fluid 182 on the same basis.

Without in any way limiting the scope, interpretation, or application of the claims appearing below, a technical effect of one or more of the example embodiments disclosed herein is to allow the user measures the hydraulic fluid in the hydraulic tank without the influence from different temperature such that the user can correctly decide whether to add or drain the hydraulic fluid. It may also help the user if there is an oil leakage issue. Another technical effect of one or more of the example embodiments disclosed herein is to make the temperature of the hydraulic fluid in the hydraulic fluid gage reflect that in the hydraulic tank, via communicating the hydraulic fluid in different depths. Another technical effect of one or more of the example embodiments disclosed herein is to ensure the volume of the hydraulic fluid in the hydraulic actuator at the pre-set value such that the hydraulic fluid is measured upon the same basis.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A hydraulic fluid gage for measuring hydraulic fluid in a hydraulic tank of a work vehicle configured to indicate a desired volume of hydraulic fluid, the hydraulic fluid gage comprising:
   a body configured to receive the hydraulic fluid from the hydraulic tank;
   a first fluid connection coupled between the body and the hydraulic tank to communicate hydraulic fluid therebetween such that a level of the hydraulic fluid in the body indicates a volume of the hydraulic fluid in the hydraulic tank;
   a thermometer for indicating a temperature of the hydraulic fluid by a level of an indicative fluid included by the thermometer; and
   a range indicator comprising a plurality of ranges of temperature, the ranges of temperature aligning vertically relative to one another, the thermometer positioned relative to the range indicator such that the temperature indicated by the level of the indicative fluid of the thermometer corresponds to one of the ranges of temperature, each of the ranges of temperature corresponding to a recommended range of the hydraulic fluid volume in the hydraulic tank wherein when the level of indicative fluid corresponds to one of the ranges of temperature of the range indicator and the level of the hydraulic fluid is within the one of the ranges of temperature of the range indicator, the hydraulic fluid volume is within the one of the recommended ranges, and when the level of indicative fluid corresponds to one of the ranges of temperature of the range indicator and the level of the hydraulic fluid is outside the one of the ranges of temperature of the range indicator, the hydraulic fluid volume is outside the one of the recommended ranges.

2. The hydraulic fluid gage of claim 1, wherein the thermometer comprises a storage portion receiving an indicative fluid and an illustrating portion with a channel coupled to a top of the storage portion allowing the indicative fluid to move along the channel based upon the temperature of the hydraulic fluid.

3. The hydraulic fluid gage of claim 1, wherein the thermometer is at least partially immersed in the hydraulic fluid.

4. The hydraulic fluid gage of claim 3, wherein the thermometer is positioned within the body.

5. The hydraulic fluid gage of claim 4, comprising a thermal conduction plate positioned within the body and at least partially immersed in the hydraulic fluid in the body.

6. The hydraulic fluid gage of claim 5, further comprising a secondary fluid connection and a third fluid connections vertically arranged with the first fluid connection.

7. The hydraulic fluid gage of claim 6, wherein when the first and third fluid connections are under the heights of the hydraulic fluid in the body and in the hydraulic tank, the thermal conduction plate is adjacent to openings of the first and third fluid connections and is configured to distribute heat from the openings of the first and third fluid connections.

8. The hydraulic fluid gage of claim 5, wherein the range indicator is attached on the thermal conduction plate.

9. The hydraulic fluid gage of claim 1, wherein the body of the hydraulic fluid gage is coupled to an exterior of the work vehicle.

10. A work vehicle, comprising:
    a hydraulic tank;
    a hydraulic fluid gage configured to indicate a desired volume of hydraulic fluid, the hydraulic fluid gage comprising:
    a body configured to receive the hydraulic fluid from the hydraulic tank;
    a first fluid connection coupled between the body and the hydraulic tank to communicate hydraulic fluid therebetween such that a level of the hydraulic fluid in the body indicates a volume of the hydraulic fluid in the hydraulic tank;
    a thermometer for indicating a temperature of the hydraulic fluid by a level of an indicative fluid included by the thermometer; and
    a range indicator comprising a plurality of ranges of temperature, the ranges of temperature aligning vertically relative to one another, the thermometer positioned relative to the range indicator such that the temperature indicated by the level of the indicative fluid of the thermometer corresponds to one of the ranges of temperature, each of the ranges of temperature corresponding to a recommended range of the volume of the hydraulic fluid in the hydraulic tank; wherein when the level of indicative fluid corresponds to one of the ranges of temperature of the range indicator and the level of the hydraulic fluid is within the one of the ranges of temperature of the range indicator, the hydraulic fluid volume is within the one of the recommended ranges, and when the level of indicative fluid corresponds to one of the ranges of temperature of the range indicator and the level of the hydraulic fluid is outside the one of the ranges of temperature of the range indicator, the hydraulic fluid volume is outside the one of the recommended ranges.

11. The work vehicle of claim 10, wherein the range indicator is positioned within the body and partially immersed in the hydraulic fluid of the body.

12. The work vehicle of claim 10, wherein the thermometer is at least partially immersed in the hydraulic fluid.

13. The work vehicle of claim 12, wherein the thermometer is positioned within the body.

14. The work vehicle of claim 13, comprising a thermal conduction plate positioned within the body and at least partially immersed in the hydraulic fluid in the body.

15. The work vehicle of claim 14, further comprising a secondary fluid connection and a third fluid connection vertically arranged with the first fluid connection.

16. The work vehicle of claim 15, wherein when the first and third fluid connections are under the heights of the hydraulic fluid in the body and in the hydraulic tank, the thermal conduction plate is adjacent to openings of the first and third fluid connections and is configured to distribute heat from the openings of the first and third fluid connections.

17. The work vehicle of claim 14, wherein the range indicator is attached on the thermal conduction plate.

18. The work vehicle of claim 10, wherein the body of the hydraulic fluid gage is coupled to an exterior of the work vehicle.

19. The work vehicle of claim 10, comprising a sensor configured to detect the extension of a hydraulic actuator to detect whether a volume of the hydraulic fluid in the hydraulic actuator at a pre-set volume.

20. The work vehicle of claim 19, comprising a controller configured to control a movement of the hydraulic actuator to ensure the volume of the hydraulic fluid in the hydraulic actuator at the pre-set volume.

\* \* \* \* \*